US009876659B2

(12) United States Patent
Vishwanathan (10) Patent No.: US 9,876,659 B2
(45) Date of Patent: Jan. 23, 2018

(54) INTERFERENCE ESTIMATION

(71) Applicant: Intel IP Corporation, Santa Clara, CA (US)

(72) Inventor: Narayan Vishwanathan, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/750,872

(22) Filed: Jun. 25, 2015

(65) Prior Publication Data

US 2016/0380791 A1     Dec. 29, 2016

(51) Int. Cl.
*H04L 27/00*        (2006.01)
*H04B 17/345*     (2015.01)
(Continued)

(52) U.S. Cl.
CPC ....... *H04L 27/0006* (2013.01); *H04B 17/345* (2015.01); *H04L 25/0204* (2013.01);
(Continued)

(58) Field of Classification Search
None
See application file for complete search history.

(56) References Cited

U.S. PATENT DOCUMENTS

| 2001/0038674 A1* | 11/2001 | Trans | ....................... | H04B 1/00 375/355 |
| 2003/0002590 A1* | 1/2003 | Kaku | ................... | H04B 1/1036 375/285 |

(Continued)

FOREIGN PATENT DOCUMENTS

| JP | 2014-508487 A | 4/2014 | |
| SE | WO 2014070101 A1 * | 5/2014 | ............ H04W 16/14 |

OTHER PUBLICATIONS

Communication dated Oct. 16, 2016 reporting the Extended European Search Report for European Patent Application No. 16172342.4.

(Continued)

*Primary Examiner* — Chi H Pham
*Assistant Examiner* — Vladislav Agureyev
(74) *Attorney, Agent, or Firm* — Schiff Hardin LLP (57) ABSTRACT

An interference estimation method and a communication device configured to estimate interference. The interference estimation method can include determining a first communication channel of a first uplink communication signal of a first communication protocol and determining a second communication channel of a second downlink communication signal of a second communication protocol. The method can further include: determining frequency spacing between the first uplink communication signal and the second downlink communication signal; determining the PSD of the transmit signal within the receiver bandwidth of the second downlink communication signal; and determining the transmit noise floor from the first uplink communication signal in the receiver bandwidth. Power integration terms can be determined based on the overall PSD of the transmit signal from first uplink communication signal within the second downlink communication channel. An interference estimation can be calculated using the interference power integration term(s).

22 Claims, 7 Drawing Sheets

(51) Int. Cl.
  *H04L 25/02* (2006.01)
  *H04L 29/06* (2006.01)
  *H04W 88/06* (2009.01)
  *H04B 17/354* (2015.01)

(52) U.S. Cl.
  CPC ............. *H04L 69/18* (2013.01); *H04W 88/06* (2013.01); *H04B 17/354* (2015.01)

(56) References Cited

U.S. PATENT DOCUMENTS

| | | | | |
|---|---|---|---|---|
| 2003/0007632 A1* | 1/2003 | Schoessow | ............ | H04L 5/143 379/399.01 |
| 2008/0304405 A1* | 12/2008 | Lindoff | ............ | H04L 27/2626 370/210 |
| 2011/0111766 A1* | 5/2011 | Yang | ............ | H04W 52/241 455/452.2 |
| 2011/0243094 A1* | 10/2011 | Dayal | ............ | H04W 16/14 370/331 |
| 2012/0034913 A1* | 2/2012 | Wang | ............ | H04W 16/14 455/426.1 |
| 2012/0071103 A1* | 3/2012 | Kadous | ............ | H04W 72/1215 455/63.1 |
| 2012/0322493 A1* | 12/2012 | Nikopour | ............ | H04W 52/265 455/522 |
| 2013/0044621 A1* | 2/2013 | Jung | ............ | H04W 72/082 370/252 |
| 2014/0295871 A1* | 10/2014 | Ahn | ............ | H04W 24/10 455/452.1 |

OTHER PUBLICATIONS

MediaTek; "Output of Email Discussion on IDC Trigger"; 3rd Generation Partnership Project, Feb. 8, 2012.

ITU-R, "Reccomendation ITU-R SM.1541-5 Unwanted emissions in the out-of-band domain SM Series Spectrum management", ITU-R, Aug. 1, 2013.

"3rd Generation Partnership Project; Technical Specification Group Radio Access Network; Evolved Universal Terrestrial Radio Access (E-UTRA); User Equipment (UE) radio transmission and reception (Realease 11)", 3rd Generation Partnership Project, Mar. 28, 2015.

Seamcat Technical Group:"Calculation of Total Emissions (including unwanted emissions) of IT falling in VR Bandwith", Aug. 20, 2012 XP055365237.

Office Action dated Apr. 24, 2017 for European Patent Application No. 16172342.4.

Office Action dated Jun. 29, 2017 for Japanese Patent Application No. 2016-103228 (with English translation).

* cited by examiner

INTERFERENCE ESTIMATION

BACKGROUND

Field

Aspects described herein generally relate to interference estimation, including estimation of inference from coexisting wireless communication protocols in a communication device.

BRIEF DESCRIPTION OF THE DRAWINGS/FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects.

The exemplary aspects of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

Figure 1:
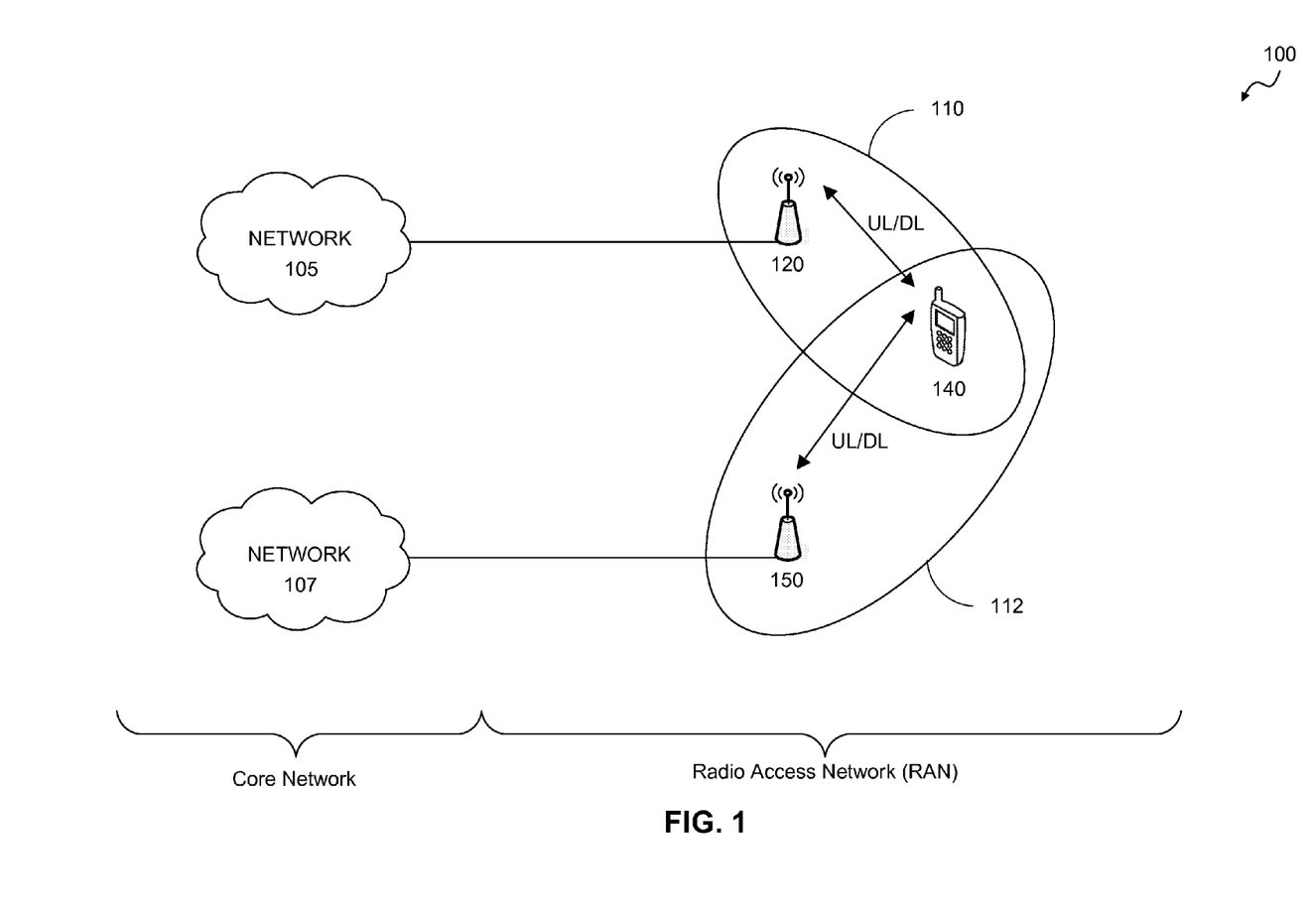
FIG. 1 illustrates an example communication environment.

FIG. 1 illustrates an example communication environment 100 that includes a radio access network (RAN) and a core network. The RAN includes a first base station 120 and a second base station 150, and one or more mobile devices 140. The core network includes backhaul communication networks 105 and 107 that are communicatively coupled to the first base station 120 and the second base station 150, respectively. The backhaul communication networks 105 and 107 can include one or more well-known communication components—such as one or more network switches, one or more network gateways, and/or one or more servers. The backhaul communication networks 105 and 107 can include one or more devices and/or components configured to exchange data with one or more other devices and/or components via one or more wired and/or wireless communications protocols. In exemplary aspects, the base station 120 communicates with one or more service providers and/or one or more other base stations 120 via the backhaul communication network 105 and the base station 150 communicates with one or more service providers and/or one or more other base stations 150 via the backhaul communication network 107. In an exemplary aspect, the backhaul communication network 105 and/or the backhaul communication network 107 are internet protocol (IP) backhaul networks.

In an exemplary aspect, the communication environment 100 can support two or more wireless communication protocols using the base stations 120 and 150. For example, the base station 120 can support one or more cellular communication protocols, including, for example, 3rd Generation Partnership Project's (3GPP) Long-Term Evolution (LTE) and the base station 150 can support one or more industrial, scientific and medical (ISM) radio bands, including, for example, wireless local access networks (WLAN) conforming to Institute of Electrical and Electronics Engineers' (IEEE) 802.11 Wi-Fi specification. In this example, the base station 120 can be referred to as LTE base station 120 (e.g., the base station 120 is an LTE base station) and base station 150 can be referred to as WLAN base station 150 or Access Point (AP) 150 (e.g., the AP 150 is a Wi-Fi access point).

In operation, the mobile device 140 can be configured to communicate with the base station 120 in a serving cell or sector 110 of the communication environment 100, and/or communicate with the AP 150 in a wireless local access network (WLAN) 112. For example, the mobile device 140 receives signals on one or more downlink (DL) channels and transmits signals to the base station 120 and/or the AP 150 on one or more respective uplink (UL) channels. That is, the mobile device 140 is configured to wirelessly communicate with the base station 120 utilizing 3GPP's LTE specification and with the AP 150 utilizing IEEE's 802.11 Wi-Fi specification. Here, the serving cell or sector 110 is an LTE serving cell or sector and the WLAN 112 is a WLAN utilizing the 802.11 Wi-Fi specification.

The base station 120 and AP 150 are not limited to these exemplary communication protocols, and the base station 120 and/or AP 150 can support one or more other protocols in addition to (or in the alternative to) the LTE and Wi-Fi communication protocols as would be understood by one of ordinary skill in the relevant arts. Further, the number of base station 120 and/or AP 150, mobile devices 140, and/or networks 105 and/or 107 are not limited to the exemplary quantities illustrated in FIG. 1, and the communication environment 100 can include any number of the various components as would be understood by one of ordinary skill in the relevant art(s).

In an exemplary aspect, the base station 120, AP 150, and/or mobile device 140 each include processor circuitry that is configured to communicate via one or more wireless technologies. The mobile device 140 can be further configured to support co-existing wireless communications (e.g., LTE and WLAN) with the base station 120 and/or AP 150. The mobile device 140, the base station 120, and AP 150 can each include one or more transceivers configured to transmit and/or receive wireless communications via one or more wireless technologies within the communication environment 100.

Examples of the mobile device 140 include (but are not limited to) a mobile computing device—such as a laptop computer, a tablet computer, a mobile telephone or smartphone, a "phablet," a personal digital assistant (PDA), and mobile media player; and a wearable computing device—such as a computerized wrist watch or "smart" watch, and computerized eyeglasses. In one or more aspects of the present disclosure, the mobile device 140 may be a stationary device, including, for example, a stationary computing device—such as a personal computer (PC), a desktop computer, a computerized kiosk, and an automotive/aeronautical/maritime in-dash computer terminal, and/or a smart device/appliance—such as, for example, smart lighting device, smart door lock, smart home security system, smart refrigerator, etc.

Figure 2:
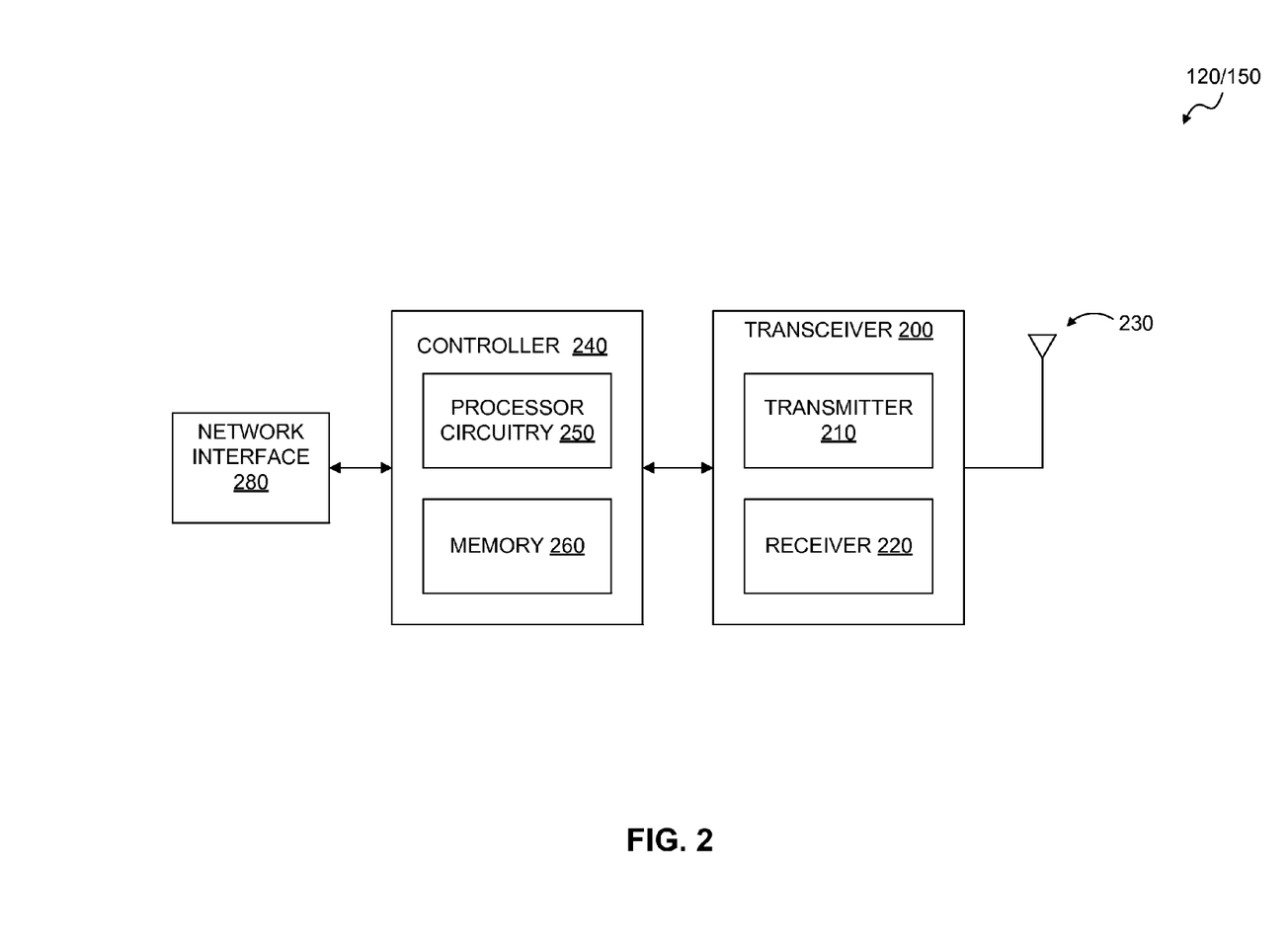
FIG. 2 illustrates a base station according to an exemplary aspect of the present disclosure.

FIG. 2 illustrates a base station and/or an access point (AP) according to an exemplary aspect of the present disclosure. In an exemplary aspect, the base station of FIG. 2 is an example of the base station 120 and/or the AP 150 of FIG. 1. For example, the base station 120 and/or AP 150 can each include a transceiver 200 and a network interface 280, each communicatively coupled to controller 240.

The transceiver 200 includes processor circuitry that is configured to transmit and/or receive wireless communications via one or more wireless technologies within the communication environment 100. For example, the transceiver 200 can include one or more transmitters 210 and one or more receivers 220 that configured to transmit and receive wireless communications, respectively, via one or more antennas 230.

In exemplary aspects when the transceiver 200 represents a transceiver of the base station 120, the transceiver 200 can be configured to transmit and receive LTE communications. In this example, the transceiver 200 can be referred to as LTE transceiver 200. Those skilled in the relevant art(s) will understand that the transceiver 200 is not limited to LTE communications, and can be configured for communications that conform to one or more other protocols in addition (or in the alternative) to the LTE communications.

In exemplary aspects when the transceiver 200 represents a transceiver of the AP 150, the transceiver 200 can be configured to transmit and receive WLAN communications (e.g., communications conforming to IEEE 802.11). In this example, the transceiver 200 can be referred to as WLAN transceiver 200. Those skilled in the relevant art(s) will understand that the transceiver 200 is not limited to WLAN communications, and can be configured for communications that conform to one or more other protocols in addition (or in the alternative) to the WLAN communications.

Those skilled in the relevant art(s) will recognize that the transceiver 200 can also include (but is not limited to) a digital signal processor (DSP), modulator and/or demodulator, a digital-to-analog converter (DAC) and/or an analog-to-digital converter (ADC), and/or a frequency converter (including mixers, local oscillators, and filters) to provide some examples. Further, those skilled in the relevant art(s) will recognize that the antenna 230 may include an integer array of antennas, and that the antenna 230 may be capable of both transmitting and receiving wireless communication signals. For example, the base station 120 and/or AP 150 can be configured for wireless communication utilizing a Multiple-input Multiple-output (MIMO) configuration.

The network interface 280 includes processor circuitry that is configured to transmit and/or receive communications via one or more wired technologies to/from the backhaul communication networks 105 and/or 107. Those skilled in the relevant art(s) will recognize that the network interface 280 can also include (but is not limited to) a digital signal processor (DSP), modulator and/or demodulator, a digital-to-analog converter (DAC) and/or an analog-to-digital converter (ADC), and/or a frequency converter (including mixers, local oscillators, and filters) to provide some examples. Further, those skilled in the relevant art(s) will understand that the network interface 280 is not limited to wired communication technologies and can be configured for communications that conform to one or more well-known wireless technologies in addition to, or alternatively to, one or more well-known wired technologies.

The controller 240 can include processor circuitry 250 that is configured to carry out instructions to perform arithmetical, logical, and/or input/output (I/O) operations of the base station 120 and/or AP 150, and/or one or more components of the base station 120 and/or AP 150. The processor circuitry 250 can be configured control the operation of the transceiver 200—including, for example, transmitting and/or receiving of wireless communications via the transceiver 200, and/or perform one or more baseband processing functions (e.g., media access control (MAC), encoding/decoding, modulation/demodulation, data symbol mapping, error correction, etc.).

The controller 240 can further include a memory 260 that stores data and/or instructions, where when the instructions are executed by the processor circuitry 250, controls the processor circuitry 250 to perform the functions described herein. The memory 260 can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory 260 can be non-removable, removable, or a combination of both.

Figure 3:
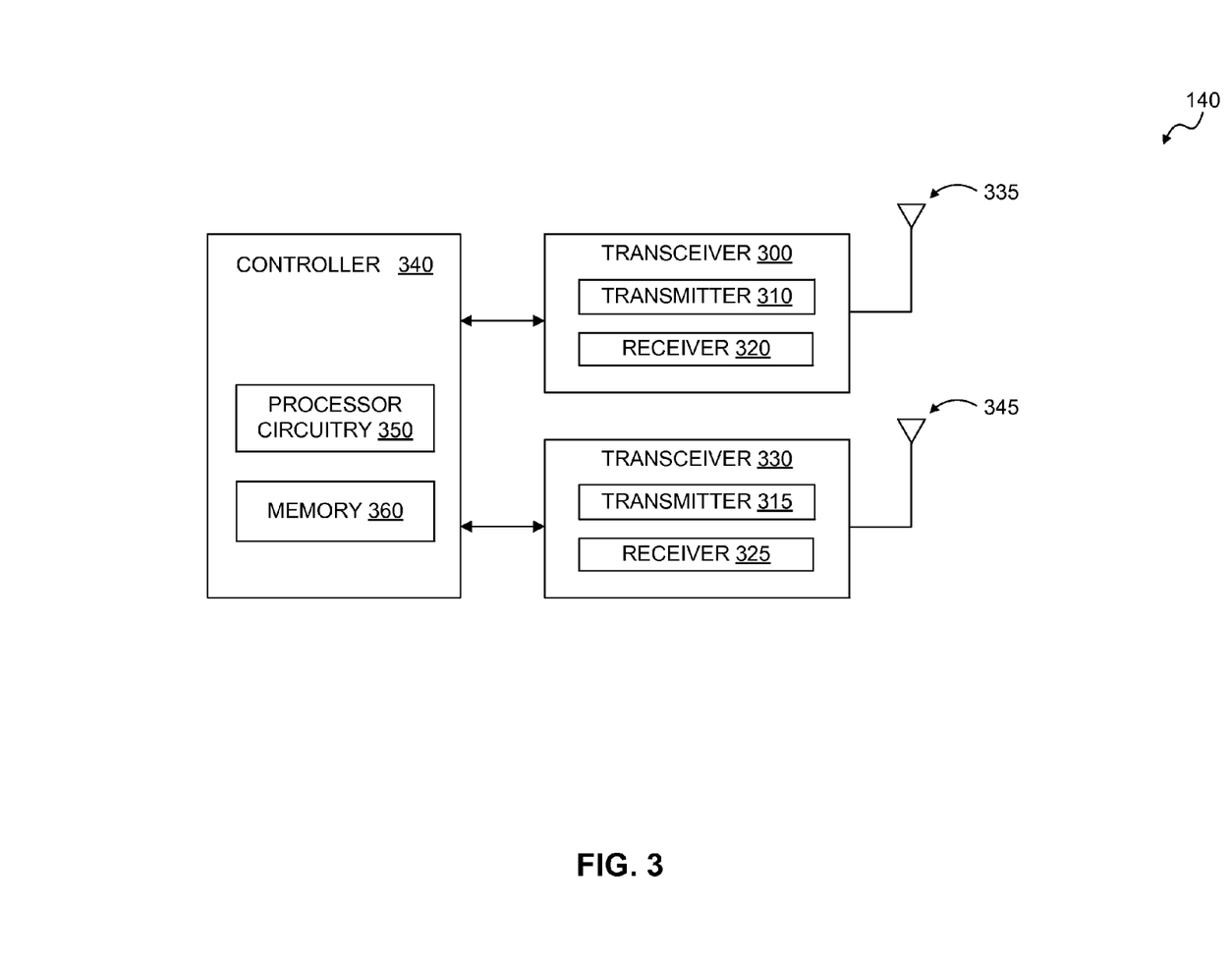
FIG. 3 illustrates a mobile device according to an exemplary aspect of the present disclosure.

FIG. 3 illustrates a mobile device according to an exemplary aspect of the present disclosure. In an exemplary aspect, the mobile device of FIG. 3 is an example of the mobile device 140 of FIG. 1. The mobile device 140 can include controller 340 communicatively coupled to transceiver 300 and transceiver 330 that are each configured to transmit and/or receive wireless communications via one or more wireless technologies within the communication environment 100.

The transceiver 300 and transceiver 330 can each include processor circuitry that is configured for transmitting and/or receiving wireless communications conforming to one or more wireless protocols. For example, the transceiver 300 can include a transmitter 310 and receiver 320 that are configured for transmitting and receiving LTE communications, respectively, via one or more antennas 335. In this example, the transceiver 300 can be referred to as LTE transceiver 300. Those skilled in the relevant art(s) will understand that the transceiver 300 is not limited to LTE communications, and can be configured for communications that conform to one or more other protocols in addition (or in the alternative) to the LTE communications.

The transceiver 330 can include a transmitter 315 and receiver 325 that are configured for transmitting and receiving WLAN communications, respectively, via one or more antennas 345. In this example, the transceiver 330 can be referred to as WLAN transceiver 330. Those skilled in the relevant art(s) will understand that the transceiver 300 is not limited to WLAN communications, and can be configured for communications that conform to one or more other protocols in addition (or in the alternative) to the WLAN communications.

In an exemplary aspect, the mobile device 140 can be configured to support co-existing wireless communications (e.g., LTE and WLAN) with the base station 120 and/or AP 150. In this example, the transceiver 300 can transmit and/or receive, for example, LTE communications while the transceiver 330 transmits and/or receives WLAN communications. An example of co-existing wireless communications is further illustrated in FIG. 4 and is discussed in more detail below.

In exemplary aspects, the transceivers 300 and/or 330 can each include (but are not limited to) a digital signal processor (DSP), modulator and/or demodulator, a digital-to-analog converter (DAC) and/or an analog-to-digital converter (ADC), and/or a frequency converter (including mixers, local oscillators, and filters) that can be utilized in transmitting and/or receiving of wireless communications. Further, those skilled in the relevant art(s) will recognize that antennas 335 and/or 345 may include an integer array of antennas, and that the antennas may be capable of both transmitting and receiving wireless communication signals.

The controller 340 can include processor circuity 350 that is configured to control the overall operation of the mobile device 140, such as the operation of the transceiver 300 and/or transceiver 330—including, for example, transmitting and/or receiving of wireless communications via the transceivers 300 and/or 330, perform one or more baseband processing functions (e.g., media access control (MAC), encoding/decoding, modulation/demodulation, data symbol mapping, error correction, etc.); perform one or more interference estimations; the running of one or more applications and/or operating systems; power management (e.g., battery control and monitoring); display settings; volume control; and/or user interactions via one or more user interfaces (e.g., keyboard, touchscreen display, microphone, speaker, etc.).

The controller 340 can further include a memory 360 that stores data and/or instructions, where when the instructions are executed by the processor circuitry 350, controls the processor circuitry 350 to perform the functions described herein. The memory 360 can be any well-known volatile and/or non-volatile memory, and can be non-removable, removable, or a combination of both.

Figure 4:
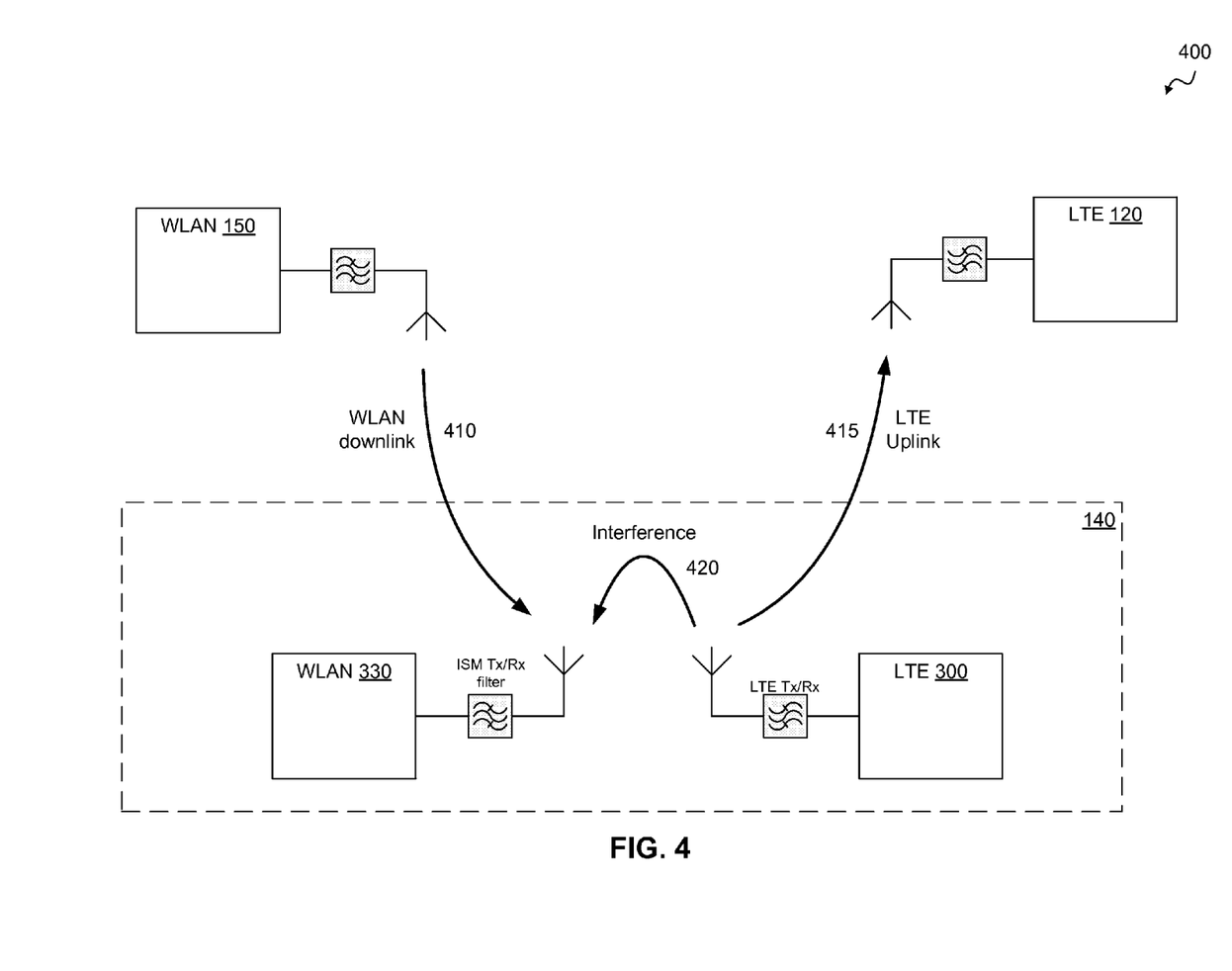
FIG. 4 illustrates a communication environment according to an exemplary aspect of the present disclosure.

In an exemplary aspect, the processor circuitry 350 can be configured to estimate interference, including interference resulting from the proximity of the LTE transceiver 300 with respect to the WLAN transceiver 330 in the mobile device 140. For example, as illustrated in FIG. 4, a portion of the uplink transmissions 415 of the LTE transceiver 300 can interfere with downlink transmissions 410 received by the WLAN transceiver 330. The portion of the LTE uplink transmission signal 415 received by the WLAN transceiver 330 is illustrated by interference signal 420. The processor circuitry 350 can estimate the interference of the interference signal 420 to control the LTE-WLAN coexistence to improve the wireless communications of the mobile device 140. For example, the processor circuitry 350 can perform one or more multiplexing operations, including one or more time-division multiplexing (TDM) operations based on the estimated interference. In an exemplary aspect, the TDM operations can include, for example, LTE uplink denial operations. In an LTE uplink denial operation, one or more LTE subframes are denied and prevented from being transmitted at the current subframe. In an exemplary aspect, the estimation can be performed in real time on a per subframe basis. The processor circuitry 350 can be a fixed-point processor (e.g., a processor with minimal or no floating point support). In operation, the interference estimation can be optimized for cycles and memory using a fixed-point processor.

In operation, the processor circuitry 350 can be configured to perform one or more interference estimations to estimate the interference of interference signal 420 and generate an interference estimation value. The processor circuitry 350 can compare the interference estimation value to one or more interference threshold values. Based on the comparison, the processor circuitry 350 can control the LTE-WLAN coexistence (e.g., perform LTE uplink denial operations).

In an exemplary aspect, the processor circuitry 350 can be configured to determine (e.g., measure, calculate, or otherwise identify) one or more characteristics of an LTE communication signal (e.g., signal 415), including, for example, frequency domain, frequency location, transmission power, power spectral density (PSD), bandwidth, and/or one or more other signal characteristics. The processor circuitry 350 can also determine (e.g., measure, calculate, or otherwise identify) the isolation between the LTE transceiver 300 and WLAN transceiver 330 and/or the attenuation of one or more filters in the signal path between the transceivers 300 and 330.

In operation, the processor circuitry 350 can be configured to perform one or more pre-estimation operations. The processor circuitry 350 can calculate filter characteristics, including the filter response of filters associated with the WLAN transceiver 330 and/or LTE transceiver 300. In an exemplary aspect, the processor circuitry 350 can be configured to calculate filter response values ($H_1$ to $H_N$) within the WLAN bandwidth. These terms characterize the overall transfer function from the LTE transmitter (e.g., transmitter 310) to WLAN receiver (e.g., receiver 325) and is measured within the WLAN bandwidth.

The processor circuitry 350 can also pre compute the contribution of the LTE transmitter (tx) noise in the WLAN bandwidth at the maximum power amplifier (PA) gain (e.g., maximum transmit power). When the LTE transmission signal characteristics in a subframe (e.g., PSD, bandwidth, frequency domain location) are such that the contribution of the LTE transmit signal in the WLAN bandwidth only contains the component from tx noise, the interference estimation can you use this precomputed value. In an exemplary aspect, a correction value can be added to this estimate to account for differences in PA gain in the subframe relative to the maximum gain (or equivalently difference in tx power in the current subframe relative to the maximum tx power).

Figure 5:
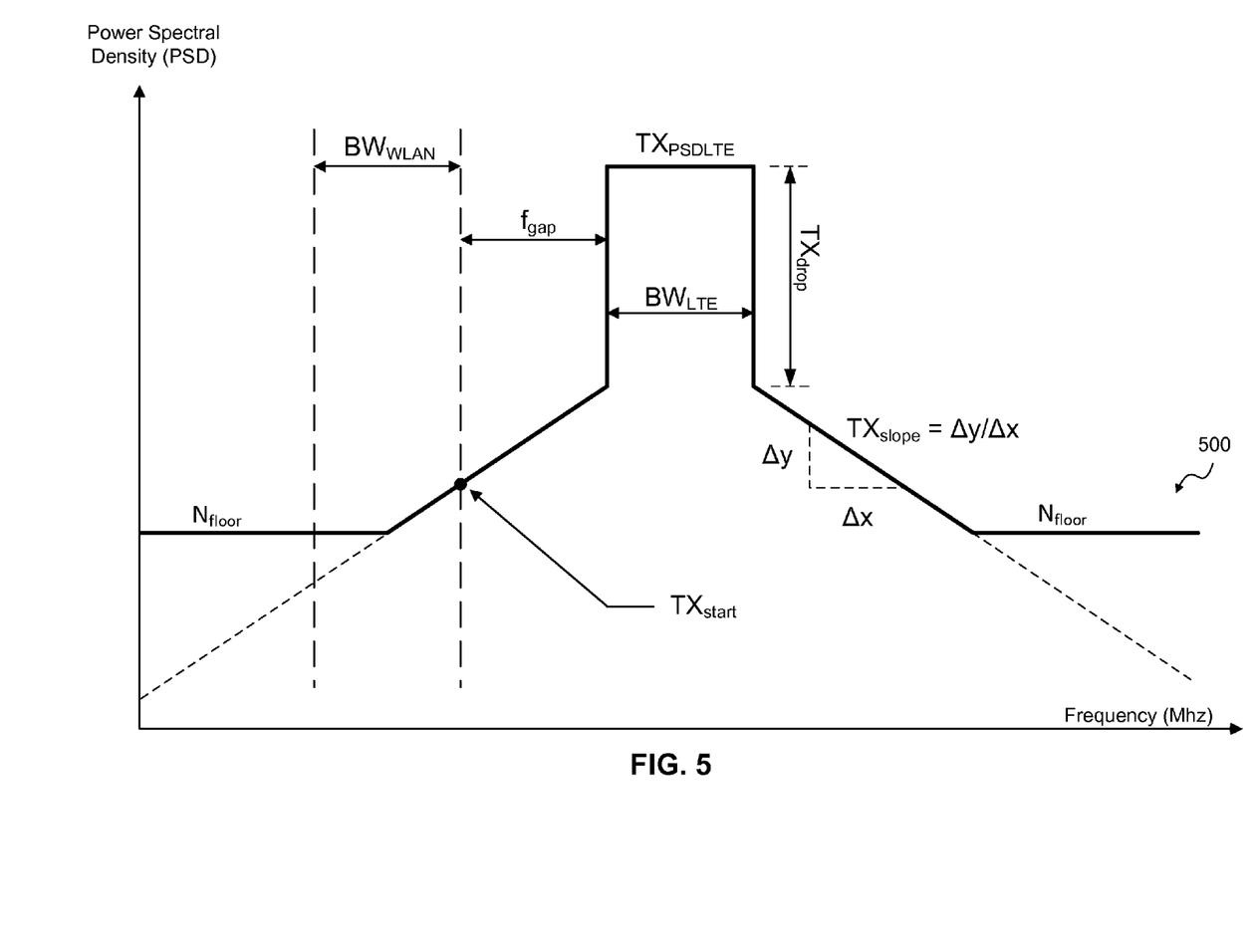
FIG. 5 illustrates an example communication signal according to an exemplary aspect of the present disclosure.

FIG. 5 illustrates an example communications signal 500 according to an exemplary aspect of the present disclosure. In an exemplary aspect, the communications signal 500 of FIG. 5 is an example of the LTE uplink transmission signal 415 of FIG. 4. For the purpose of this discussion, the communications signal 500 will be referred to as the LTE uplink transmission signal 415, but is not limited thereto.

In an LTE-WLAN coexistence environment, a portion LTE uplink transmission signal 415 can interfere with the communications of the WLAN transceiver (e.g., WLAN transceiver 330). This is illustrated by the portion of the LTE uplink transmission signal 415 extending into the operating bandwidth (e.g., $BW_{WLAN}$) of the WLAN transceiver 330. This portion of the LTE uplink transmission signal 415 can correspond to the interference signal 420.

As illustrated in FIG. 5, the communications signal 500 (LTE uplink transmission signal 415) includes a bandwidth (e.g., $BW_{LTE}$) of the current subframe and is transmitted at a power resulting in a transmission power spectral density ($TX_{PSDLTE}$) within the LTE bandwidth. The transmission edge of the LTE uplink transmission signal 415 (e.g., lower frequency bound of the $BW_{LTE}$) is separated in the frequency domain from the receiving edge of the WLAN downlink transmission signal 410 (e.g., upper frequency bound of the $BW_{WLAN}$) by a frequency gap ($f_{gap}$). Outside of the LTE bandwidth $BW_{LTE}$, the transmission power spectral density of the LTE uplink transmission signal 415 is modelled as follows: The transmission power spectral density has a drop off (e.g., PSD drop) characterized by the term $TX_{drop}$. The $TX_{drop}$ can be determined (e.g., calculated) by radio frequency (RF) and/or baseband characterizations of the LTE transceiver 300 and/or one or more LTE communication signals (e.g. LTE uplink transmission signal 415). The $TX_{drop}$ can have a value of, for example, 30 dB, but is not limited thereto. That is, the $TX_{drop}$ can have one or more other values as would be understood by those skilled in the relevant arts. Following the drop off, transmitter signal power spectral density outside the LTE transmission bandwidth now has a gradual decay towards the noise level ($N_{floor}$). In an exemplary aspect, the noise level ($N_{floor}$) (e.g., the tx noise level) can be adjusted for a power amplifier (PA) gain setting of the LTE transceiver 300 in the subframe under consideration. A slope term characterized by $TX_{slope}$ is used to model the linear decay of the LTE uplink transmission signal PSD as it gradually drops off towards the transmitter noise floor the ($N_{floor}$).

In an exemplary aspect, the processor circuitry 350 can be configured to determine (e.g., measure, calculate, or otherwise identify) one or more of the frequency gap ($f_{gap}$), transmission power spectral density within the LTE bandwidth ($TX_{PSDLTE}$), PSD drop ($TX_{drop}$), LTE bandwidth ($BW_{LTE}$), WLAN bandwidth ($BW_{WLAN}$), noise level ($N_{floor}$), and/or PSD slope ($TX_{slope}$).

In an exemplary aspect, the PSD slope ($TX_{slope}$) can be calculated based on the following Equation 1:

$$TX_{slope} = \frac{TX_{rolloff}}{BW_{LTE}}$$

where the unit of $TX_{slope}$ is in dB/MHz, and the PSD roll-off ($TX_{rolloff}$) is a radio frequency (RF) characterization value.

The PSD roll-off ($TX_{rolloff}$) can have a value of, for example, 10 dB, but is not limited thereto. The PSD roll-off ($TX_{rolloff}$) can be calculated by RF and/or baseband characterizations of the LTE transceiver 300 and/or one or more LTE communication signals (e.g., LTE signal 415). For the purpose of this discussion, the PSD roll-off ($TX_{rolloff}$) is a constant value (e.g., 10 dB). However, it is not limited to constant values and can be variable in one or more aspects of the disclosure.

In an exemplary aspect, values of the PSD slope ($TX_{slope}$) can be stored in a look-up-table (LUT) corresponding to possible LTE transmission bandwidth values. For example, the LUT can include one or more allowable transmission bandwidth values defined by the LTE protocol. In this example, the LUT can be indexed by the bandwidth values and include corresponding PSD slope ($TX_{slope}$) values calculated based on Equation 1. PSD slope ($TX_{slope}$) is the rate of change of the LTE transmit signal power spectral density outside of the LTE transmission signal bandwidth.

The processor circuitry 350 can be configured to calculate a PSD roll-off rate value ($TX_{delta}$) over the integration resolution bandwidth (IBR). $TX_{delta}$ is the change in transmission power spectral density (PSD) due to the PSD decaying term over IBR. In an exemplary aspect, $TX_{delta}$ can be calculated based on the following Equation 2:

$$TX_{delta} = TX_{slope} \times F_{factor}$$

where $F_{factor}$ is a frequency factor. In an exemplary aspect, the $F_{factor}$ can be a constant value of, for example, 0.5, but is not limited thereto.

As illustrated in FIG. 5, the receiving edge of the WLAN downlink transmission signal 410 (e.g., upper frequency bound of the $BW_{WLAN}$) intersects the LTE uplink transmission signal 415 at point $TX_{start}$. $TX_{start}$ corresponds to the first term ($I_1$) of the interference due to PSD roll off in the WLAN channel. $TX_{start}$ can be calculated based on the transmission power spectral density within the LTE bandwidth ($TX_{PSDLTE}$), the frequency gap ($f_{gap}$), the PSD drop ($TX_{drop}$), and the PSD slope ($TX_{slope}$). In an exemplary aspect, $TX_{start}$ can be calculated based on the following Equation 3.1:

$$TX_{start} = TX_{PSDLTE} - TX_{drop} - (TX_{slope} \times f_{gap}) = I_1$$

Using $TX_{start}$, the processor circuitry 350 can be configured to calculate subsequent terms ($I_2$-$I_N$) of the interference due to PSD roll off in the WLAN channel. The terms ($I_1$-$I_N$) can be referred to as transmit signal PSD decay terms, and can represent contributions by the tx PSD roll off (e.g., linear decay) to the interference. In an exemplary aspect, terms ($I_2$-$I_N$) can be calculated based on the following Equations 3.2 to 3.N:

$$I_2 = I_1 - TX_{delta} = I_{start} - TX_{delta}$$

$$I_3 = I_2 - TX_{delta}$$

$$I_4 = I_3 - TX_{delta}$$

$$\vdots$$

$$I_N = I_{N-1} - TX_{delta}$$

Based on the contribution of terms ($I_1$-$I_N$), the processor circuitry 350 can be configured to calculate interference power integration terms ($P_1$-$P_N$). The interference power integration terms ($P_1$-$P_N$) correspond to the larger of: the interference due to PSD roll off terms (e.g., transmit power slope terms) in the WLAN channel and the tx noise level ($N_{floor}$) in the WLAN channel. The interference power integration terms ($P_1$-$P_N$) can be further based on one or more of the filter response values ($H_1$ to $H_N$). In an exemplary aspect, interference power integration terms ($P_1$-$P_N$) can be calculated based on the following Equations 4.1 to 4.N:

$$P_1 = \max(I_1, N_{floor}) - H_1$$

$$P_2 = \max(I_2, N_{floor}) - H_2$$

$$P_3 = \max(I_3, N_{floor}) - H_3$$

$$P_4 = \max(I_4, N_{floor}) - H_4$$

$$\vdots$$

$$P_N = \max(I_N, N_{floor}) - H_N$$

Based on the interference power integration terms ($P_1$-$P_N$), the processor circuitry 350 can be configured to estimate the interference power $P_{intf}$. In an exemplary aspect, the interference power $P_{intf}$ can be calculated based on the following Equation 5:

$$P_{intf} = 10 \times \log_{10}\left(10^{\frac{P_1}{10}} + 10^{\frac{P_2}{10}} + 10^{\frac{P_3}{10}} + \ldots 10^{\frac{P_N}{10}}\right)$$

In operation, the processor circuitry 350 can be configured to compare the estimated interference power value $P_{intf}$ to one or more interference threshold values. Based on the comparison, the processor circuitry 350 can control the LTE-WLAN coexistence (e.g., perform LTE uplink denial operations).

In an exemplary aspect, the processor circuitry 350 can be configured to calculate the maximum ($P_{max}$) of the interference power integration terms ($P_1$ to $P_N$). In this example, $P_{max}$ can satisfy the following Equation 6:

$$P_{max} = \max(P_1, P_2, P_3, \ldots P_N)$$

Using $P_{max}$ and the interference power integration terms ($P_1$ to $P_N$), the processor circuitry 350 can be configured to calculate power delta terms ($\delta_1$ to $\delta_N$). In this example, the power delta terms ($\delta_1$ to $\delta_N$) can be calculated based on the following Equations 7.1 to 7.N:

$$\delta_1 = P_1 - P_{max}$$
$$\delta_2 = P_2 - P_{max}$$
$$\delta_3 = P_3 - P_{max}$$
$$\delta_4 = P_4 - P_{max}$$
$$\vdots$$
$$\delta_N = P_N - P_{max}$$

Using the power delta terms ($\delta_1$ to $\delta_N$) and $P_{max}$, the processor circuitry 350 can be configured to calculate the interference power $P_{intf}$. In an exemplary aspect, the interference power $P_{intf}$ can be calculated based on the following Equation 8:

$$P_{intf} = P_{max} + 10 \times \log_{10}\left(1 + 10^{\frac{\delta_1}{10}} + 10^{\frac{\delta_2}{10}} + 10^{\frac{\delta_3}{10}} + \ldots 10^{\frac{\delta_N}{10}}\right)$$

In this example, the interference power $P_{intf}$ can be expressed in a simplified Equation 9 below:

$$P_{intf} = P_{max} + 10 \times \log_{10}(B)$$
$$\text{where } B = 1 + 10^{\frac{\delta_1}{10}} + 10^{\frac{\delta_2}{10}} + 10^{\frac{\delta_3}{10}} + \ldots 10^{\frac{\delta_N}{10}}$$

In an exemplary aspect, the individual factors in the summation of B can be stored in a look-up-table (LUT). For example, the LUT can include $$10^{\frac{\delta_1}{10}} \text{ to } 10^{\frac{\delta_N}{10}},$$

and be indexed by a range of delta terms in steps of, for example, 1 dB.

The term "$\log_{10}(B)$" of Equation 9 can be calculated using a normalization operation and one or more look-up-tables (LUT). For example, $\log_{10}(B)$ can be represented by the following Equation 10:

$$\log_{10}(B) = M \times \log_2(10) + \log_2(10) \times \log_2\left(1 + \frac{y}{2^M}\right)$$

where $B = 2^M + y$ and M is the largest possible integer such that $2^M \leq B$.

A look-up-table (LUT) can then be used that includes, for example, 16 values of $$\log_2\left(1 + \frac{y}{2^M}\right)$$

which are indexed by 16 values of $$\frac{y}{2^M}$$

that satisfy:

$$0 \leq \frac{y}{2^M} \leq \frac{15}{16}$$

Figure 6A:
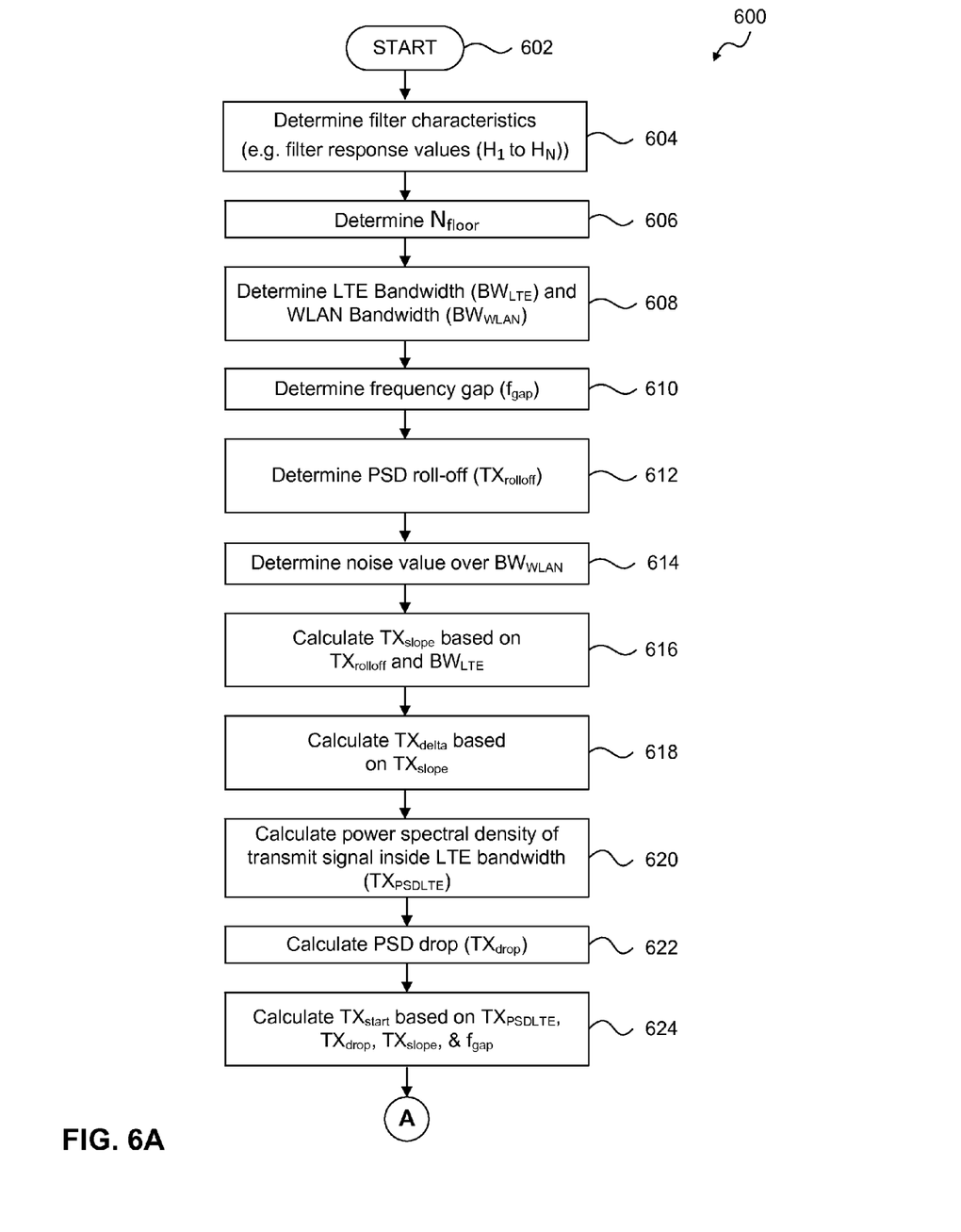
FIGS. 6A and 6B illustrate an interference estimation method according to an exemplary aspect of the present disclosure.
Figure 6B:
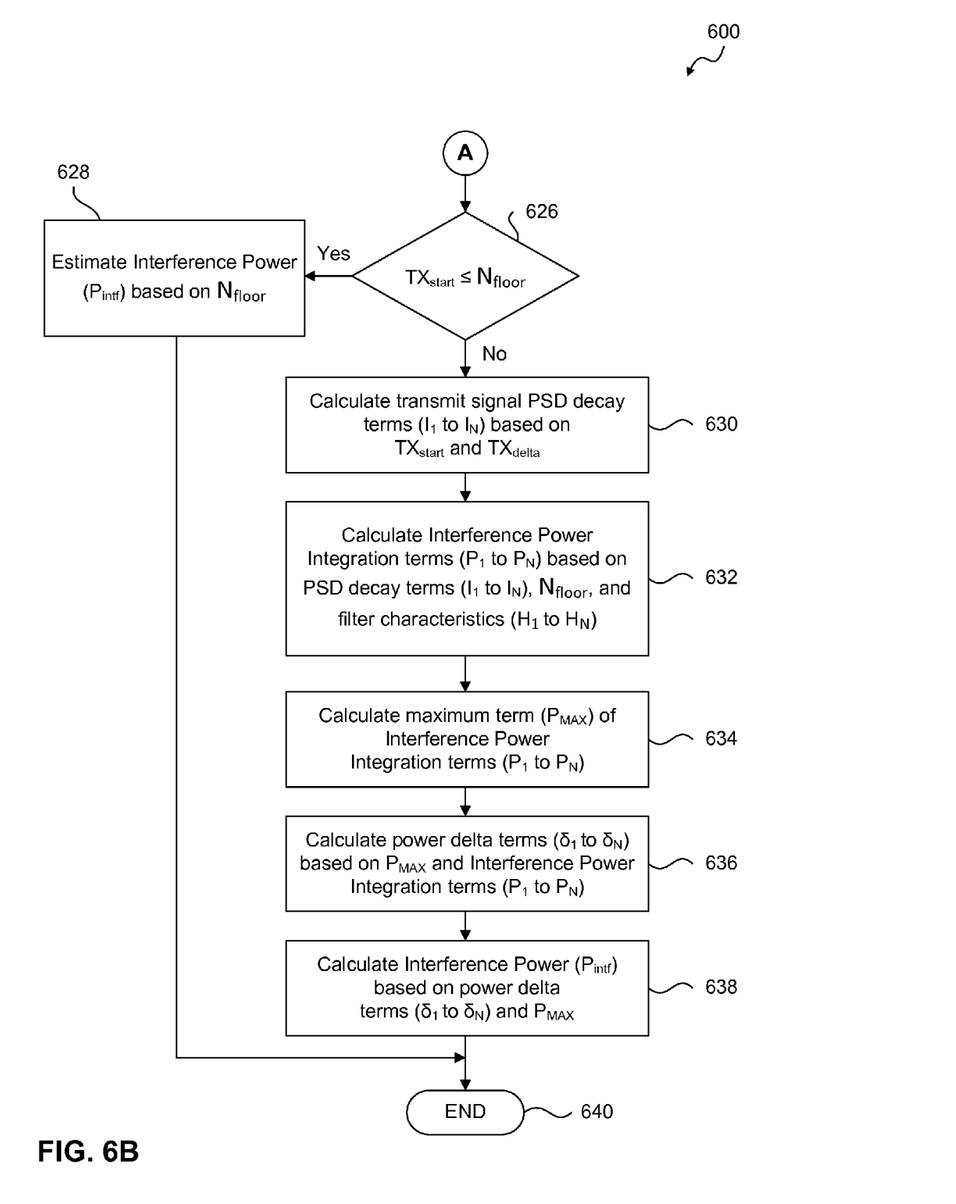

FIGS. 6A and 6B illustrate a flowchart of an interference estimation method 600 according to an exemplary aspect of the present disclosure. The flowchart is described with continued reference to FIGS. 1-5. The steps of the method are not limited to the order described below, and the various steps may be performed in a different order. Further, two or more steps of the method may be performed simultaneously with each other.

The method of flowchart 600 begins at step 602 and transitions to step 604, where filter characteristics are obtained. The filter characteristics can be obtained from pre-computation as described above. In an exemplary aspect, the processor circuitry 350 can predetermine filter response values ($H_1$ to $H_N$) within the WLAN bandwidth. This represents the overall transfer function from LTE transmitter to WLAN receiver. In exemplary aspects where the flowchart 600 is repeated, the determination of filter characteristics (e.g., filter response values ($H_1$ to $H_N$)) in step 604 can be omitted and the previously determined values can be used.

After step 604, the flowchart 600 transitions to step 606, where the noise level ($N_{floor}$) in the WLAN channel is determined. The processor circuitry 350 can be configured to calculate/measure noise level ($N_{floor}$) using RF characterizations of the LTE transceiver 300, WLAN transceiver 330, and/or one or more LTE and/or WLAN communication signals.

After step 606, the flowchart 600 transitions to step 608, where the LTE bandwidth ($BW_{LTE}$) and the WLAN bandwidth ($BW_{WLAN}$) are determined.

After step 608, the flowchart 600 transitions to step 610, where the frequency gap ($f_{gap}$) is calculated. The processor circuitry 350 can calculate the frequency gap ($f_{gap}$) between the transmission edge of the LTE uplink transmission signal 415 (e.g., lower frequency bound of the $BW_{LTE}$) and the receiving edge of the WLAN downlink transmission signal 410 (e.g., upper frequency bound of the $BW_{WLAN}$).

After step 610, the flowchart 600 transitions to step 612, where the PSD roll-off ($TX_{rolloff}$) is calculated. The processor circuitry 350 can calculate the PSD roll-off ($TX_{rolloff}$) using RF and/or baseband characterizations of the LTE transceiver 300. The PSD roll-off ($TX_{rolloff}$) can have a value of, for example, 10 dB.

After step 612, the flowchart 600 transitions to step 614, where integration of the tx noise over the WLAN bandwidth is obtained. The calculations can be obtained from pre-computed value as described above. In an exemplary aspect, the processor circuitry 350 can perform one or more noise calculations, including the integration of the LTE tx noise power spectral density (PSD) over the WLAN bandwidth ($BW_{WLAN}$) for one or more LTE transmission power values. The processor circuitry 350 can calculate the LTE transmitter (tx) noise in the WLAN bandwidth at the maximum power amplifier (PA) gain (e.g., maximum transmit power). In exemplary aspects where the flowchart 600 is repeated, the integration of the tx noise over the WLAN bandwidth in step 612 can be omitted and the previously determined integrated values can be used.

After step 614, the flowchart 600 transitions to step 616, where the PSD slope ($TX_{slope}$) can be calculated. In an exemplary aspect, the processor circuitry 350 can be configured to calculate the PSD slope ($TX_{slope}$) using Equation 1 as discussed above.

After step 616, the flowchart 600 transitions to step 618, where PSD roll-off rate value ($TX_{delta}$) is calculated. In an exemplary aspect, the processor circuitry 350 can be configured to calculate the PSD roll-off rate value ($TX_{delta}$) using Equation 2 as discussed above.

After step 618, the flowchart 600 transitions to step 620, where the transmission power spectral density ($TX_{PSDLTE}$) within the LTE bandwidth is determined (e.g., calculated/measured). The processor circuitry 350 can be configured to determine (e.g., calculate/measure) the transmission power spectral density ($TX_{PSDLTE}$) within the LTE channel based on the LTE transceiver 300 and/or RF characterizations of on one or more LTE communication signals.

After step 620, the flowchart 600 transitions to step 622, where the PSD drop ($TX_{drop}$) can be determined (e.g., calculated/measured). The processor circuitry 350 can be configured to determine (e.g., calculate/measure) the PSD drop ($TX_{drop}$) can be determined using RF and or baseband characterizations of the LTE transceiver 300 and/or one or more LTE communication signals.

After step 622, the flowchart 600 transitions to step 624, where $TX_{start}$ (the first term ($I_1$) of the interference due to LTE PSD slope terms (transmit PSD roll off portion) in the WLAN channel) is calculated. The processor circuitry 350 can be configured to calculate $TX_{start}$ based on the transmission power spectral density ($TX_{PSDLTE}$), the frequency gap ($f_{gap}$), the PSD drop ($TX_{drop}$), and the PSD slope ($TX_{slope}$). In an exemplary aspect, $TX_{start}$ can be calculated based on Equation 3.1 as discussed above.

After step 624, the flowchart 600 transitions to step 626, where it is determined if $TX_{start}$ (the first term ($I_1$) of the interference due to LTE PSD slope terms (transmit signal PSD roll off portion) in the WLAN channel) is less than or equal to the noise level ($N_{floor}$). The processor circuitry 350 can be configured to perform this determination by comparing the values of $TX_{start}$ and the noise level ($N_{floor}$) to each other. If $TX_{start}$ is less than or equal to the noise level ($N_{floor}$) (Yes at step 626), the flowchart 600 transitions to step 628. If $TX_{start}$ is greater than the noise level ($N_{floor}$) (No at step 626), the flowchart 600 transitions to step 630.

At step 628, the interference power $P_{intf}$ can be estimated based on the noise level ($N_{floor}$) in the WLAN channel. For example, the processor circuitry 350 can be configured to integrate the power spectral density (PSD) (e.g., the noise level ($N_{floor}$)) of the LTE communication signal over the WLAN bandwidth ($BW_{WLAN}$). In an exemplary aspect, the value of the integration of the tx noise (e.g., pre-computed value obtained from step 614) can be corrected for the PA gain in current subframe relative to the maximum PA gain (e.g., the difference in transmit power in current subframe relative to the maximum transmit power can be determined).

In this example, because $TX_{start}$ is less than or equal to the noise level ($N_{floor}$), the interference in the WLAN channel is due to the noise level ($N_{floor}$) in the WLAN channel (e.g., the interference due to LTE PSD roll off terms (e.g., transmit power slope terms) is negligible).

At step 630, the transmit power slope terms (PSD roll off terms) of the WLAN channel (WLAN bandwidth ($BW_{WLAN}$)) are calculated. For example, the processor circuitry 350 can be configured to calculate transmit power slope terms ($I_2$-$I_N$) based on $TX_{start}$ and roll-off rate value ($TX_{delta}$). In an exemplary aspect, terms ($I_2$-$I_N$) can be calculated based on Equations 3.2 to 3.N as discussed above.

After step 630, the flowchart 600 transitions to step 632, where interference power integration terms ($P_1$-$P_N$) can be calculated. The interference power integration terms ($P_1$-$P_N$) correspond to the larger of: the interference due to transmit power slope terms (LTE PSD roll off terms) in the WLAN channel and the tx noise level ($N_{floor}$) in the WLAN channel. The interference power integration terms ($P_1$-$P_N$) can be further based on one one or more of the filter response values ($H_1$ to $H_N$). In an exemplary aspect, the processor circuitry 350 can be configured to calculate the interference power integration terms ($P_1$-$P_N$) based on Equations 4.1 to 4.N as discussed above.

After step 632, the flowchart 600 transitions to step 634, where the maximum interference power integration term ($P_{max}$) is calculated. In an exemplary aspect, the processor circuitry 350 can be configured to calculate the maximum ($P_{max}$) of the interference power integration terms ($P_1$ to $P_N$) using Equation 6 as discussed above.

After step 634, the flowchart 600 transitions to step 636, where power delta terms ($\delta_1$ to $\delta_N$) are calculated. In an exemplary aspect, the processor circuitry 350 can be configured to calculate power delta terms ($\delta_1$ to $\delta_N$) based on $P_{max}$ and the interference power integration terms ($P_1$ to $P_N$). The processor circuitry 350 can be configured to calculate power delta terms ($\delta_1$ to $\delta_N$) based on Equations 7.1 to 7.N as discussed above.

After step 636, the flowchart 600 transitions to step 638, where the power interference power $P_{intf}$ is estimated. The processor circuitry 350 can be configured to estimate the interference power $P_{intf}$ based on the power delta terms ($\delta_1$ to $\delta_N$) and $P_{max}$. The estimation can be based on Equation 8 as discussed above.

In an exemplary aspect, the processor circuitry 350 can be configured to estimate the interference power $P_{intf}$ by determining the individual logarithmic terms $$\left(10^{\frac{\delta_1}{10}} \text{ to } 10^{\frac{\delta_N}{10}}\right)$$

(e.g., the terms of B in Equation 9). In this example, the processor circuitry 350 can be configured to perform one or more normalization operation to calculate the logarithm of B as illustrated above in Equations 9 and 10.

After step 638, the flowchart 600 transitions to step 640, where the flowchart 600 ends. The flowchart 600 may be repeated one or more times. In an exemplary aspect, the flowchart 600 is repeated for one or more subsequent LTE subframes.

EXAMPLES

Example 1 is a communication method, comprising: identifying a first communication channel of a first communication signal of a first communication protocol; identifying a second communication channel of a second communication signal of a second communication protocol; calculating a frequency spacing between the first and second communication signals; and estimating interference of the first communication signal on the second communication signal in the second communication channel based on the determined frequency spacing.

In Example 2, the subject matter of Example 1, wherein the interference comprises one or more power spectral density (PSD) decay contributions of the first communication signal in the second communication channel.

In Example 3, the subject matter of Example 2, wherein the interference further comprises a noise level of the first communication signal.

In Example 4, the subject matter of Example 1, wherein the first communication signal is an uplink communication signal and the second communication signal is a downlink communication signal.

In Example 5, the subject matter of Example 1, further comprising: identifying a bandwidth of the first communication channel; and calculating a rate of change of a power spectral density (PSD) of the first communication signal based on the bandwidth of the first communication channel.

In Example 6, the subject matter of Example 5, further comprising: calculating one or more PSD decay terms of the first communication signal based on the rate of change of the PSD of the first communication signal and the frequency spacing; and calculating one or more interference power integration terms based on the one or more PSD decay terms, wherein estimating the interference is based on the one or more interference power integration terms.

In Example 7, the subject matter of Example 6, wherein estimating the interference further comprises: identifying a maximum of the one or more interference power integration terms; and calculating one or more power delta terms based on the one or more interference power integration terms and the maximum of the one or more interference power integration terms, wherein estimating the interference is based on the one or more power delta terms and the maximum of the one or more interference power integration terms.

In Example 8, the subject matter of Example 6, further comprising: calculating a PSD of the first communication signal within the first communication channel, wherein calculating the one or more PSD decay terms is further based on the PSD of the first communication signal within the first communication channel.

In Example 9, the subject matter of Example 6, wherein calculating the one or more interference power integration terms further comprises: comparing the one or more PSD decay terms to a noise level of the first communication signal, wherein the one or more interference power integration terms are calculated based on the comparison.

Example 10 is a communication device, comprising: a first transceiver configured to transmit a first communication signal of a first communication protocol; a second transceiver configured to receive a second communication signal of a second communication protocol; and a controller configured to: identify a first communication channel of the first communication signal; identify a second communication channel of the second communication signal; calculate a frequency spacing between the first and second communication signals; and estimate interference of the first communication signal on the second communication signal in the second communication channel based on the determined frequency spacing.

In Example 11, the subject matter of Example 10, wherein the interference comprises one or more power spectral density (PSD) decay contributions of the first communication signal in the second communication channel.

In Example 12, the subject matter of Example 11, wherein the interference further comprises a noise level of the first communication signal.

In Example 13, the subject matter of Example 10, wherein the second transceiver receives at least a portion of the first communication signal transmitted by the first transceiver.

In Example 14, the subject matter of Example 10, wherein the controller is further configured to: determine a bandwidth of the first communication channel; and calculate a rate of change of a power spectral density (PSD) of the first communication signal based on the bandwidth of the first communication channel.

In Example 15, the subject matter of Example 14, wherein the controller is further configured to: calculate one or more PSD decay terms of the first communication signal based on the rate of change of the PSD of the first communication signal and the frequency spacing; and calculate one or more interference power integration terms based on the one or more PSD decay terms, wherein estimating the interference is based on the one or more interference power integration terms.

In Example 16, the subject matter of Example 15, wherein the controller is further configured to: calculate a maximum of the one or more interference power integration terms; and calculate one or more power delta terms based on the one or more interference power integration terms and the maximum of the one or more interference power integration terms, wherein the estimating the interference is based on the one or more power delta terms and the maximum of the one or more interference power integration terms.

In Example 17, the subject matter of Example 15, wherein the controller is further configured to: calculate a PSD of the first communication signal within the first communication channel, wherein calculating the one or more PSD decay terms is further based on the PSD of the first communication signal within the first communication channel.

In Example 18, the subject matter of Example 15, wherein the controller is further configured to: compare the one or more PSD decay terms to a noise level of the first communication signal; and calculate the one or more interference power integration terms based on the comparison.

Example 19 is a communication method, comprising: identifying a communication channel of an uplink communication signal of a first communication protocol; identifying a communication channel of a downlink communication signal of a second communication protocol; and estimating interference of the uplink communication signal on the downlink communication signal in the second communication channel, the estimating the interference including: calculating one or more interference power integration terms associated with one or more power spectral density (PSD) decay terms of the first uplink communication signal; and calculating the interference based on the one or more interference power integration terms.

In Example 20, the subject matter of Example 19, wherein estimating the interference further comprises: calculating a frequency spacing between the uplink communication signal and the downlink communication signal; determining a bandwidth of the communication channel of the uplink communication signal; calculating a rate of change of a PSD of the first uplink communication signal based on the bandwidth; and calculating the one or more PSD decay terms based on the rate of change of the PSD of the first uplink communication signal and the frequency spacing.

Example 21 is a communication device, comprising: a first transceiving means for transmitting a first communication signal of a first communication protocol; a second transceiving means for receiving a second communication signal of a second communication protocol; and a controlling means for: identifying a first communication channel of the first communication signal; identifying a second communication channel of the second communication signal; calculating a frequency spacing between the first and second communication signals; and estimating interference of the first communication signal on the second communication signal in the second communication channel based on the determined frequency spacing.

In Example 22, the subject matter of Example 21, wherein the interference comprises one or more power spectral density (PSD) decay contributions of the first communication signal in the second communication channel.

In Example 23, the subject matter of Example 22, wherein the interference further comprises a noise level of the first communication signal.

In Example 24, the subject matter of any of Examples 21-23, wherein the second transceiving means receives at least a portion of the first communication signal transmitted by the first transceiving means.

In Example 25, the subject matter of any of Examples 21-23, wherein the controlling means is further configured for: determining a bandwidth of the first communication channel; and calculating a rate of change of a power spectral density (PSD) of the first communication signal based on the bandwidth of the first communication channel.

In Example 26, the subject matter of Example 25, wherein the controlling means is further configured for: calculating one or more PSD decay terms of the first communication signal based on the rate of change of the PSD of the first communication signal and the frequency spacing; and calculating one or more interference power integration terms based on the one or more PSD decay terms, wherein estimating the interference is based on the one or more interference power integration terms.

In Example 27, the subject matter of Example 26, wherein the controlling means is further configured for: calculating a maximum of the one or more interference power integration terms; and calculating one or more power delta terms based on the one or more interference power integration terms and the maximum of the one or more interference power integration terms, wherein the estimating the interference is based on the one or more power delta terms and the maximum of the one or more interference power integration terms.

In Example 28, the subject matter of Example 26, wherein the controlling means is further configured for: calculating a PSD of the first communication signal within the first communication channel, wherein calculating the one or more PSD decay terms is further based on the PSD of the first communication signal within the first communication channel.

In Example 29, the subject matter of Example 26, wherein the controlling means is further configured for: comparing the one or more PSD decay terms to a noise level of the first communication signal; and calculating the one or more interference power integration terms based on the comparison.

Example 30 is a communication method, comprising: identifying a communication channel of an uplink communication signal of a first communication protocol; identifying a communication channel of a downlink communication signal of a second communication protocol; and estimating interference of the uplink communication signal on the downlink communication signal in the second communication channel, the estimating the interference including: calculating one or more interference power integration terms associated with one or more power spectral density (PSD) decay terms of the first uplink communication signal; and calculating the interference based on the one or more interference power integration terms.

In Example 31, the subject matter of Example 30, wherein estimating the interference further comprises: calculating a frequency spacing between the uplink communication signal and the downlink communication signal; determining a bandwidth of the communication channel of the uplink communication signal; calculating a rate of change of a PSD of the first uplink communication signal based on the bandwidth; and calculating the one or more PSD decay terms based on the rate of change of the PSD of the first uplink communication signal and the frequency spacing.

Example 32 is an apparatus comprising means to perform a method as described in any of Examples 30-31.

Example 33 is a machine-readable storage including machine-readable instructions, when executed, implement a method or realize an apparatus as described in any of Examples 21-31.

Example 34 is the subject matter of Example 1, wherein the interference comprises one or more power spectral density (PSD) decay contributions of the first communication signal in the second communication channel.

In Example 35, the subject matter of Example 2, wherein the interference further comprises a noise level of the first communication signal.

In Example 36, the subject matter of any of Examples 1-3, wherein the first communication signal is an uplink communication signal and the second communication signal is a downlink communication signal.

In Example 37, the subject matter of any of Examples 1-3, further comprising: determining a bandwidth of the first communication channel; and calculating a rate of change of a power spectral density (PSD) of the first communication signal based on the bandwidth of the first communication channel.

In Example 38, the subject matter of Example 37, further comprising: calculating one or more PSD decay terms of the first communication signal based on the rate of change of the PSD of the first communication signal and the frequency spacing; and calculating one or more interference power integration terms based on the one or more PSD decay terms, wherein estimating the interference is based on the one or more interference power integration terms.

In Example 39, the subject matter of Example 38, wherein estimating the interference further comprises: calculating a maximum of the one or more interference power integration terms; and calculating one or more power delta terms based on the one or more interference power integration terms and the maximum of the one or more interference power integration terms, wherein estimating the interference is based on the one or more power delta terms and the maximum of the one or more interference power integration terms.

In Example 40, the subject matter of Example 38, further comprising: calculating a PSD of the first communication signal within the first communication channel, wherein calculating the one or more PSD decay terms is further based on the PSD of the first communication signal within the first communication channel.

In Example 41, the subject matter of Example 38, wherein calculating the one or more interference power integration terms further comprises: comparing the one or more PSD decay terms to a noise level of the first communication signal, wherein the one or more interference power integration terms are calculated based on the comparison.

Example 42 is an apparatus substantially as shown and described.

Example 43 is a method substantially as shown and described.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processor circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

As will be apparent to a person of ordinary skill in the art based on the teachings herein, exemplary aspects are not limited to the LTE and WLAN protocols. The exemplary aspects can be applied to other cellular communication protocols/standards, including (but not limited to) Evolved High-Speed Packet Access (HSPA+), Wideband Code Division Multiple Access (W-CDMA), CDMA2000, Time Division-Synchronous Code Division Multiple Access (TD-SCDMA), Global System for Mobile Communications (GSM), General Packet Radio Service (GPRS), Enhanced Data Rates for GSM Evolution (EDGE), and Worldwide Interoperability for Microwave Access (WiMAX) (IEEE 802.16) to provide some examples. Further, exemplary aspects can be implemented in other kinds of wireless communication access networks, including (but not limited to) Bluetooth, Near-field Communication (NFC) (ISO/IEC 18092), ZigBee (IEEE 802.15.4), Z-Wave, and/or Radio-frequency identification (RFID), to provide some examples. Further, exemplary aspects are not limited to the above wireless networks and can be used or implemented in one or more wired networks using one or more well-known wired specifications and/or protocols.

What is claimed is:

1. A communication method, comprising:
    identifying a first communication channel of a first communication signal of a first communication protocol;
    identifying a second communication channel of a second communication signal of a second communication protocol;
    calculating a frequency spacing between the first and the second communication signals;
    calculating a rate of change of a power spectral density (PSD) of the first communication signal; and
    estimating interference between the first communication signal and the second communication signal in the second communication channel based on the frequency spacing and the rate of change of the PSD of the first communication signal.

2. The communication method of claim 1, wherein the interference comprises one or more PSD decay contributions of the first communication signal in the second communication channel.

3. The communication method of claim 2, wherein the interference further comprises a noise level of the first communication signal.

4. The communication method of claim 1, wherein the first communication signal is an uplink communication signal and the second communication signal is a downlink communication signal.

5. The communication method of claim 1, further comprising:
identifying a bandwidth of the first communication channel, wherein
the rate of change of the PSD of the first communication signal is calculated based on the bandwidth of the first communication channel.

6. The communication method of claim 5, further comprising:
calculating one or more PSD decay terms of the first communication signal based on the rate of change of the PSD of the first communication signal and the frequency spacing; and
calculating one or more interference power integration terms based on the one or more PSD decay terms,
wherein estimating the interference is based on the one or more interference power integration terms.

7. The communication method of claim 6, wherein estimating the interference further comprises:
identifying a maximum of the one or more interference power integration terms; and
calculating one or more power delta terms based on the one or more interference power integration terms and the maximum of the one or more interference power integration terms,
wherein estimating the interference is based on the one or more power delta terms and the maximum of the one or more interference power integration terms.

8. The communication method of claim 6, further comprising:
identifying a PSD of the first communication signal within the first communication channel,
wherein calculating the one or more PSD decay terms is further based on the PSD of the first communication signal within the first communication channel.

9. The communication method of claim 6, wherein calculating the one or more interference power integration terms further comprises:
comparing the one or more PSD decay terms to a noise level of the first communication signal,
wherein the one or more interference power integration terms are calculated based on the comparison.

10. A communication device, comprising:
a first transceiver configured to transmit a first communication signal of a first communication protocol;
a second transceiver configured to receive a second communication signal of a second communication protocol; and
a controller configured to:
identify a first communication channel of the first communication signal;
identify a second communication channel of the second communication signal;
calculate a frequency spacing between the first and the second communication signals;
calculate a rate of change of a power spectral density (PSD) of the first communication signal; and
estimate interference between the first communication signal and the second communication signal in the second communication channel based on the frequency spacing and the rate of change of the PSD of the first communication signal.

11. The communication device of claim 10, wherein the interference comprises one or more PSD decay contributions of the first communication signal in the second communication channel.

12. The communication method of claim 11, wherein the interference further comprises a noise level of the first communication signal.

13. The communication device of claim 10, wherein the second transceiver receives at least a portion of the first communication signal transmitted by the first transceiver.

14. The communication device of claim 10, wherein the controller is further configured to:
determine a bandwidth of the first communication channel; and
calculate the rate of change of the PSD of the first communication signal based on the bandwidth of the first communication channel.

15. The communication device of claim 14, wherein the controller is further configured to:
calculate one or more PSD decay terms of the first communication signal based on the rate of change of the PSD of the first communication signal and the frequency spacing; and
calculate one or more interference power integration terms based on the one or more PSD decay terms,
wherein estimating the interference is based on the one or more interference power integration terms.

16. The communication device of claim 15, wherein the controller is further configured to:
calculate a maximum of the one or more interference power integration terms; and
calculate one or more power delta terms based on the one or more interference power integration terms and the maximum of the one or more interference power integration terms,
wherein the estimating the interference is based on the one or more power delta terms and the maximum of the one or more interference power integration terms.

17. The communication device of claim 15, wherein the controller is further configured to:
calculate a PSD of the first communication signal within the first communication channel,
wherein calculating the one or more PSD decay terms is further based on the PSD of the first communication signal within the first communication channel.

18. The communication device of claim 15, wherein the controller is further configured to:
compare the one or more PSD decay terms to a noise level of the first communication signal; and
calculate the one or more interference power integration terms based on the comparison.

19. A communication method, comprising:
identify a communication channel of an uplink communication signal of a first communication protocol;
identify a communication channel of a downlink communication signal of a second communication protocol; and
estimating interference of the uplink communication signal on the downlink communication signal in the second communication channel, the estimating the interference including:
calculating a rate of change of a power spectral density (PSD) of the uplink communication signal based on a bandwidth of the communication channel of the uplink communication signal;

calculating the one or more PSD decay terms based on the rate of change of the PSD of the uplink communication signal and a frequency spacing between the uplink communication signal and the downlink communication signal;

calculating one or more interference power integration terms associated with the one or more PSD decay terms of the uplink communication signal; and calculating the interference based on the one or more interference power integration terms.

20. The communication method of claim 19, wherein estimating the interference further comprises:

calculating the frequency spacing between the uplink communication signal and the downlink communication signal; and determining the bandwidth of the communication channel of the uplink communication signal.

21. The communication method of claim 1, wherein the rate of change of the PSD of the first communication signal is calculated based on a characteristic of the first communication channel.

22. The communication method of claim 1, wherein the rate of change of the PSD of the first communication signal is calculated based on a bandwidth of the first communication channel.

* * * * *